United States Patent Office 3,585,042
Patented June 15, 1971

3,585,042
METHOD OF PREPARING NON-STICKY ANIMAL FEEDS COMPRISING MOLASSES MEAL
Peter Nairne Boyes and Thomas Geoffrey Cleasby, Maidstone, North Coast, Natal, Republic of South Africa, assignors to Moreland Molasses Company Limited
No Drawing. Filed June 27, 1967, Ser. No. 649,108
Claims priority, application Republic of South Africa, July 7, 1966, 66/3,307; Feb. 6, 1967, 67/0,672
Int. Cl. A23l *1/04;* C12b *3/04*
U.S. Cl. 99—6
7 Claims

ABSTRACT OF THE DISCLOSURE

A method of counteracting the characteristic stickiness of animal feeds incorporating molasses, such as molasses meal, by applying to the feed such micro-organisms as will specifically degrade the gum content of the molasses in the feed.

---

This invention relates to the preparation of stock feeds.

In the sugar industry, three by-products obtained are molasses, bagasse and filter press cake or defecation scum. All of these by-products can be used as animal feeds but one which is particularly nutritious and economical is molasses meal which comprises a mixture of molasses and a fraction of bagasse known as cane flour. The latter comprises both cane fibers and pith in a proportion of approximately 1 to 1. The molasses meal is manufactured by a process in which molasses is absorbed by dried cane flour in special machinery but it is to be understood that the cane flour may be replaced by any dry roughage having good absorbent properties and the term "molasses meal" is to be construed accordingly.

A disadvantage with molasses meals arises in the handling thereof by the farmer. The feed, usually containing from 45 to 90% molasses and preferably in the range of 60 to 80% of this product, is incorporated into animal rations to form a balanced feed and consequently it is highly desirable, from the farmer's point of view, to use a free flowing material which mixes easily. When a molasses meal having 60 to 80% molasses content is subjected to compression, such as may occur during transport or stacking in bags, it compacts due to the adhesive nature of the molasses with the result that mixing of the product is made difficult and lumps are usually formed in the final feed ration. This tendency of molasses meals to compact and form lumps is at least partly due to the gums present in all molasses fractions to a certain degree, usually about 4 to 5%. The gums give rise to the sticky nature of the molasses.

It will be understood the word "gums" covers an extremely wide range of compounds having varying physical and chemical properties. In this specification, therefore, the term "gums" is to be construed as referring to those organic substances which give rise to the normal sticky nature of molasses.

It is an object of the invention at least to reduce the sticky nature of molasses so that compacting of the meal product formed therefrom is substantially minimized and the product possesses an increased ability to mix easily.

According to the invention a method of preparing a molasses meal having decreased tendency to compact and form lumps, includes the step of *inoculating* the molasses meal with a selected micro-organism operative to degrade at least some of the gum content thereof. In the method according to the invention the prepared molasses meal is inoculated.

It has been found that micro-organisms can be selected and applied specifically to break down the gum content of the molasses employed in the molasses meal and that when this is done the characteristic stickiness of the material is lessened and the feed incorporating the molasses becomes friable and easy to mix even after it has been compressed. The feed prepared according to the invention is accordingly a great deal easier to handle and mix in the formation of a balanced ration.

Also according to the invention a suitable micro-organism is selected for inoculation of the molasses meal and the latter is subsequently bagged to allow the breaking down of the gums to proceed while the molasses meal is so stored. Normally aerobic or facultative anaerobic micro-organisms will be used and the bags will be sealed in a fashion permitting ingress of a certain amount of air. For example polyethylene bags may be sealed by sewing instead of heat sealing. In this fashion little extra burden is placed on the factory since the process proceeds during a period when the feed would in any event be stored, and during its transportation to its destination. However, hermetically sealed bags could still include sufficient oxygen to allow propagation of the micro-organisms to an extent to which the breaking down of gums proceeds to the required degree.

It will be appreciated that while the important consideration in selecting the micro-organism is its ability to decompose the gums present in the molasses it is essential that the decomposition products should be non-toxic and also that the micro-organisms themselves shall not be pathogenic. In addition it is preferable that the microbiological activity of the organisms should be substantially selective to gums and that their propagation should be controlled when these have been decomposed. The control is obtained in the process of the invention by limiting the oxygen supply available to the micro-organisms, such as by storing the inoculated meal in bags. While certain organisms may be effective in breaking down gums other aspects of their activity may render them entirely unsuitable for use in the process. For example (i) Certain species of Aspergilli and Penicillia produce mycotoxins.

(ii) Organisms which produce butyric acid. The latter is a common product of carbohydrate fermentation and is highly undesirable due to its harmful effect in ensiling processes in which molasses meal is often used.

(iii) Thermophilic bacteria, for example *Clostridium butyricum* and *Clostridia bacilli,* which cause overheating and consequently a hazard of spontaneous combustion.

(iv) Yeasts which break down sucrose and reduce the food value of the meal.

Further according to the invention a suitable micro-organism is selected from bacteria of the genera Achromobacter and Athrobacter and/or certain fungi of the genera Penicillium and Aspergillus.

Still further according to the invention the micro-organism is selected by allowing molasses meal to undergo natural microbial attack, extracting the micro-organisms so developed on the molasses, isolating therefrom the species of micro-organisms which are operative to degrade the sticky components of the molasses, and artificially inoculating the molasses to be treated with the micro-organisms, or their descendants, so isolated.

Thus an extract of all micro-organisms developed on molasses subjected to natural microbial attack may be utilized to inoculate various culture media to develop the various species. In this way and by carefully selecting microbial samples from colonies developed on the various media for selective multiplication, the various species may be isolated.

The pure, or relatively pure, microbial species so obtained may be multiplied and separately utilized for the inoculation of test quantities of molasses meal. After a period of two to three weeks some of the control, or test batches, of molasses meal will have lost some of their adherent or sticky quality, that is they will have become more friable and in this way the micro-organisms operative for the purpose of the present invention will be isolated and can be used for inoculation of large quantities of molasses meal to the exclusion of inoperative micro-organisms. Bacteria of the genera Achromobacter and Athrobacter have been identified as operative to degrade the sticky components of molasses while several species of fungi of the genera Penicillium and Aspergillus, which were isolated by the above described procedure are equally effective. By artificially inoculating molasses meals therewith relatively rapid results are obtained. It will be appreciated also that the degree of increase in the friability of the product is raised by artificial inoculation due to the use of higher concentrations of the operative micro-organisms than pertains in any natural process.

The invention also includes within its scope a method of inoculating a molasses meal comprising the steps of heating molasses, mixing the hot mobile molasses with a desired absorbent cellulosic material, cooling the mass to below 40° C. and subsequently spraying sterile water, to which the selected and propagated micro-organisms have been added, onto the mass. It has been found in practice that the molasses meal may be cooled by blowing air into it.

Further in accordance with the invention, therefore, the molasses meal is cooled by passing the meal along a conveyor and passing air through the meal during its passage therealong.

Still further according to the invention the meal is inoculated with the micro-organisms while it is still in the conveyor and after it has been sufficiently cooled.

In order to illustrate the invention and the manner in which it may be carried out the following example is given. It is to be understood, however, that the example is given for purposes of illustration only and that the broad scope of the invention is set out in the claims.

EXAMPLE (a) A small test sample of molasses meal which had been allowed to stand in the open for fourteen days to allow natural propagation of micro-organisms thereon was selected for isolation of the microbial species to be used for artificial inoculation of a large batch of freshly prepared molasses meal.

The molasses meal was one comprising molasses absorbed on cane flour in the weight ratio of 75 to 25 but other types of molasses meals may also be treated.

The test sample of molasses meal had matured to an extent at which it had lost some of its stickiness but other undesirable biological processes had also set in. One gram of the sample was placed in a sterilized bottle containing 99 cc. of sterilized water and agitated. By means of a sterile pipette, one cc. of the solution was transferred to a sterile bottle containing 9 cc. of sterile water. By proceeding in this way several bottles containing the micro-organisms through a dilution range of $10^{-2}$ to $10^{-6}$ of the original concentration of the micro-organism containing solution were obtained.

Six one cc. aliquots from each of the above bottles were transferred to separate sterile petri dishes and each dish of a set of six dishes per bottle was charged with a different agar selected from the group comprising: potato dextrose agar, Czapek's agar, Sabourand's agar, malt sucrose agar, nutrient agar and nutrient agar and sucrose. The agar in each dish was allowed to set and incubated at 20–30° C. for seven days to fourteen days.

From the colonies grown in the various agar media isolations were made onto agar slants of the same kind. The transference of colonies from slant to slant was repeated until pure cultures were obtained on the various slants.

In this way 40–50 pure cultures were obtained.

(b) The microbial species isolated in step (a) were then grown in agar mass cultures and each organism was harvested and sprayed in sterile water onto its own test batch of fresh molasses meal.

After seven to fourteen days each test batch was examined and several were found to exhibit friable properties. Of these one was superior. The micro-organism which had been responsible for the degradation of the gums resulting in the molasses meal becoming friable in this superior sample was identified as a Penicillium, possibly *Penicillium luteum*.

(c) The selected penicillium fungus was allowed to sporulate on a medium of molasses meal and a 5% malt extract at 30° C., in a 250 ml. Erlenmeyer flask ⅓ full. A loopful from this flask was used to inoculate a large number of ⅔ full Erlenmeyer flasks containing malt extract and molasses meal. In this way the culture can be continuously propagated, but it is important to note that continuous propagation on agar alone will result in deadaptation of the culture. It is important to note also that the mass culture produced for application in the method of the invention is at its optimum efficiency after sporulation has proceeded for seven days. At this stage the highest spore count (of viable spores) is obtained and the culture should be used then.

(d) To make the fresh molasses meal, which was to be treated by the process of the invention, the molasses was warmed to approximately 44° C. to decrease its viscosity and render it pumpable. This solution was then mixed with a suitable absorbent cellulosic material, in this case cane flour, but if desired a peat moss or other material, in a Wenger molasses mixer where the temperature of the molasses rose further to 50° C.

The meal leaving the mixer was still too hot for contact with the selected micro-organism and had, accordingly, to be cooled prior to the inoculation step. Since the molasses meal is generally produced on a continuous basis it is not feasible to allow the meal to be left to cool. The temperature of the mass was, therefore, reduced by blowing air, which had been drawn through a sterilizing medium, into the meal until the temperature was below about 40° C., preferably at 35° C. The cooling step was carried out in a 14″ diameter, 6″ pitch screw conveyor turning at 25 r.p.m., and of length sufficient to give a residence time of approximately three minutes. The air required for cooling was found to be 100 ft.$^3$ per minute at 100 p.s.i.g. let down to atmospheric pressure through ⅛″ jets spaced 1′ apart along the first ⅔ or "cooling section" of the conveyor. This enabled the temperature of the meal to be reduced from 50° C. to below 40° C. in about two minutes.

The selected micro-organisms, washed from the nutrient media of step (c) into sterile water to give a pregnant solution were sprayed in the form of a fine mist onto the meal in the end ⅓ or "mixing zone" of the conveyor. During its passage along the mixing zone of the conveyor the pregnant liquid was thoroughly mixed into the meal.

Twenty liters of the pregnant solution per ton of meal were used, but this can be reduced substantially either to give a slower gum degradation or, if this is to be unchanged, by using a pregnant liquor having a higher spore count.

In the example under consideration there were 20–24×10$^3$ spores per ml. of solution and it was found that at this concentration excellent gum breakdown was obtained in a period of fourteen days.

The treated meal at the end of the conveyor was discharged into bags, suitably polyethylene bags, and sewn at the top to permit the ingress of a small amount of air, so enabling the aerobic micro-organisms to propagate.

After a period of about fourteen days the treated meal had become friable and easy to mix with other materials for the production of suitable stock feeds. The meal was resistant to compaction and less liable to form lumps.

It will be appreciated that by varying the parameters of spore concentration and time the same end result can be obtained, e.g. at 60 liters per ton the same result can be obtained in three days. Alternatively at lower concentration a longer period would be required.

The optimum moisture content for propagation of the micro-organism is 16%–18% and the pH of the meal should be approximately 5.2. In any event acid conditions are required.

What we claim is:

1. A method of preparing a molasses meal having decreased tendency to compact and form lumps due to the presence of gums and sticky components of the molasses, said method comprising inoculating the molasses meal with a micro-organism selected from the microbial species developed by allowing the molasses meal to undergo natural microbial attack, extracting from the resultant meal the micro-organisms developed thereon, isolating therefrom the species of micro-organisms which are operative to degrade the gum and sticky components of the molasses, and artificially inoculating the molasses meal to be treated with the isolated micro-organisms or their descendants.

2. The method of claim 1 wherein the micro-organism is selected from bacteria of the genera Achromobacter and Athrobacter and/or fungi of the genera Penicillium and Aspergillus.

3. The method of claim 1 wherein the molasses meal inoculated with the selected micro-organisms is charged into bags permitting the ingress of a small amount of air, and the degradation of the gum in the molasses meal being allowed to proceed in said bags.

4. The method of claim 1 including the steps of heating molasses, mixing the hot molasses with an absorbent cellulosic material, cooling the mass to below 40° C. and subsequently spraying a pregnant liquor containing the selected micro-organisms onto the mass.

5. The method of claim 3 wherein the molasses meal is charged into polyethylene bags which are sealed by sewing.

6. The meal of claim 1 stored in a bag permitting the ingress of a limited quantity of air.

7. The meal of claim 6 in which the bags are polyethylene bags sealed by sewing.

References Cited

UNITED STATES PATENTS

| | | | |
|---|---|---|---|
| 704,530 | 7/1902 | Fraser | 99—6 |
| 1,032,511 | 7/1912 | Shiverick | 99—142 |
| 1,608,010 | 11/1926 | Takamine, Jr., et al. | 99—142X |
| 2,202,161 | 5/1940 | Miner | 99—5 |
| 2,333,638 | 11/1943 | Chalkley | 99—171 |
| 2,643,213 | 6/1953 | Hall | 99—2(AB) |
| 3,085,049 | 4/1963 | Rudy et al. | 99—2 |
| 3,249,512 | 5/1966 | Bode | 195—31 |
| 3,279,923 | 10/1966 | Bauer et al. | 99—2(AB) |
| 2,607,359 | 8/1952 | Oesting | 195—7UX |
| 2,821,501 | 1/1958 | Simpson | 195—7 |
| 2,822,303 | 2/1958 | Campbell et al. | 127—38 |
| 2,891,868 | 6/1959 | Heggie et al. | 99—135 |
| 3,105,014 | 9/1963 | Harrison | 195—2X |
| 3,220,928 | 11/1965 | Brenner | 195—2 |

FOREIGN PATENTS

| | | | |
|---|---|---|---|
| 851,601 | 10/1960 | Great Britain | 99—6 |
| 257,691 | 9/1926 | Great Britain | 99—6 |

OTHER REFERENCES

Maple Sirup XVII July 9, 1960, Chemical Inhibitors, Food Tech. (Frank et al.), vol. XV, No. 1, pp. 1–3.

NORMAN YUDKOFF, Primary Examiner

F. E. DRUMMOND, Assistant Examiner

U.S. Cl. X.R.

195—2, 7